United States Patent [19]
Mueller et al.

[11] 3,933,445
[45] Jan. 20, 1976

[54] PROCESS AND APPARATUS FOR PREVENTING DEPOSITS ON A GAS INLET NOZZLE

[75] Inventors: David E. Mueller; William J. Metrailer, both of Baton Rouge, La.

[73] Assignee: Exxon Research and Engineering Company, Linden, N.J.

[22] Filed: Oct. 15, 1973

[21] Appl. No.: 406,219

[52] U.S. Cl. .................. 48/197 R; 48/63; 48/202; 48/206; 201/31
[51] Int. Cl.² ............................................ C10J 3/54
[58] Field of Search ....... 23/288 S, 288.3 S; 48/202, 48/206, 210, 63, 86 R, 73, 78, 197 R, 77, 99, 101; 201/31; 34/10, 57, DIG. 13; 259/DIG. 17; 432/15, 58; 118/DIG. 5

[56] References Cited
UNITED STATES PATENTS

| | | | |
|---|---|---|---|
| 2,683,657 | 7/1954 | Garbo | 48/202 |
| 2,994,659 | 8/1961 | Slyngstad et al. | 23/288 S X |
| 3,040,439 | 6/1962 | Frost | 23/288 S X |
| 3,256,612 | 6/1966 | Dollinger | 23/288 S X |
| 3,298,793 | 1/1967 | Mallison et al. | 23/288 S |
| 3,661,543 | 5/1972 | Saxton | 48/206 |
| 3,672,577 | 6/1972 | Kramer | 23/288 S X |
| 3,723,180 | 3/1973 | Brown | 23/288 S X |

FOREIGN PATENTS OR APPLICATIONS

| | | | |
|---|---|---|---|
| 334,235 | 7/1903 | France | 48/86 R |

*Primary Examiner*—S. Leon Bashore
*Assistant Examiner*—Peter F. Kratz
*Attorney, Agent, or Firm*—Marthe L. Gibbons

[57] ABSTRACT

An oxidizing gas is injected through a nozzle into a bed of carbonaceous particles in a downward direction at an angle of declination at least as great as the angle of repose of the bed particles and at a gas inlet velocity of about 50 to 500 feet per second to supply the gas needed to fluidize the bed of carbonaceous particles.

7 Claims, 2 Drawing Figures

PROCESS AND APPARATUS FOR PREVENTING DEPOSITS ON A GAS INLET NOZZLE

BACKGROUND OF THE INVENTION

1. Field of the Invention

This invention relates to a process for preventing the deposition of solids on a gas inlet nozzle positioned in a fluidized bed of particles. It particularly relates to a method of preventing the presence of stagnant or slow moving particles in the zone of the gas inlet in a bed of particles. More particularly, it relates to preventing the formation of metallic ash deposits on the nozzle inlet which supplies an oxidizing gas to fluidize a bed of carbonaceous solids containing metallic contaminants.

2. Description of the Prior Art

Fluid bed gasification processes in which a solid carbonaceous material is reacted with an oxygen-containing gas, such as, air or oxygen, and/or steam are well-known in the art. Such a gasification process is shown, for example, in U.S. Pat. No. 3,661,543, which is incorporated herein by reference, and in which an oxidizing gas (air or oxygen) and steam are injected into the bottom of a coke gasification zone. In such processes, the gas inlet nozzle is located in the fluid coke bed and conventionally discharges a gas steam upwardly into the bed. Usually, areas of defluidized coke are present between nozzle injection points. When petroleum coke, which contains metallic contaminants, such as, vanadium and nickel components, is gasified by reaction with steam and an oxidizing gas to produce a fuel gas, a metallic ash-rich coke residue builds up near and around the oxidizing gas inlet of the conventional straight tube, upwardly directed, nozzle. Some of this ash subsequently forms a deposit on the surface and tip of the gas inlet nozzle and thereby interferes with the operation of the nozzle. It is believed that the passage of the metallic ash-rich coke particles through the small oxidizing zone near the gas inlet causes some of the metallic components to be converted to metallic oxides, some of which melt at a temperature lower than the temperature at which the gasification zone is maintained. This molten material readily adheres to the surface and tip of the gas inlet nozzle, solidifies and clogs the orifice of the nozzle.

It has now been found that the presence of stagnant or slow moving particles near the oxidizing gas inlet nozzle and the consequent formation of a solid deposition on the nozzle can be minimized or prevented when the oxidizing gas which also serves as fluidizing gas is injected into a bed of particles in a downward direction at a specified angle and at a given gas exit velocity from the nozzle.

SUMMARY OF THE INVENTION

In accordance with the invention there is provided a process for preventing the presence of relatively slower moving particles in the immediate gas inlet zone of a fluidized bed of particles, which comprises introducing a fluidizing gas into a bed of particles as a downwardly directed stream at an angle of declination (from the horizontal axis) at least as great as the angle of repose of the bed particles and at an inlet velocity into said bed of about 50 to 500 feet per second.

An improved apparatus for carrying out the process of the invention is also provided.

PREFERRED EMBODIMENT OF THE INVENTION

The preferred embodiment of the invention will be described with reference to the accompanying drawing.

Figure 1:
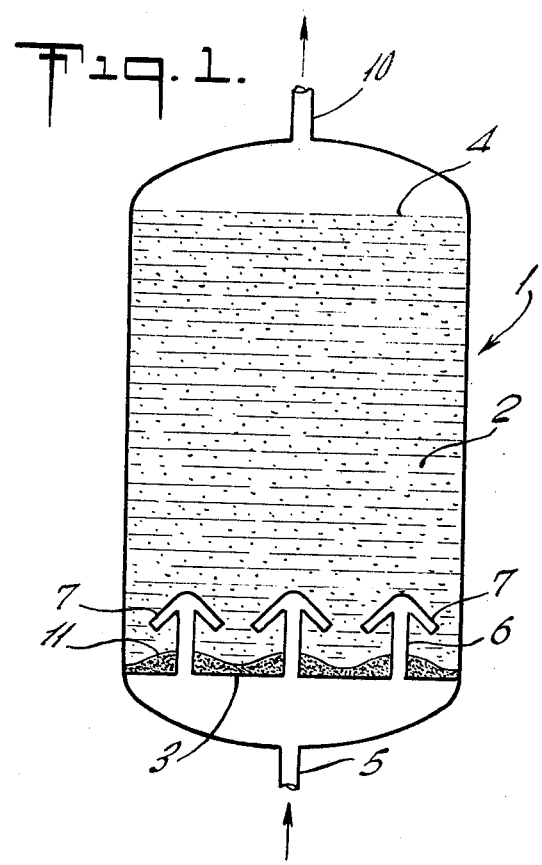
FIG. 1 illustrates, in diagrammatic form, a suitable apparatus for carrying out a preferred embodiment of the invention.

Referring to FIG. 1, a gasifier 1 contains a bed of carbonaceous material (coke) 2 supported on a bed support sheet 3. When the bed is fluidized by the introduction of a fluidizing gas into the bed, as will be described later, the fluidized bed has an upper level indicated at 4. Generally, a portion of defluidized carbonaceous particles having a level indicated at 11 is also present under operating conditions. Although in the following description the carbonaceous material present in the gasifier will be designated as coke, suitable solid carbonaceous materials for the gasification process include petroleum coke, coal coke, coal, peat, graphite, charcoal or mixtures thereof. When it is desired to obtain a fuel gas comprising hydrogen and carbon monoxide by gasification of coke with steam and an oxygen-containing gas, the gasifier is maintained at a temperature of about 1000° to 2800°F., preferably in the range of about 1700° to 1900°F. and at a pressure up to about 2000 pounds per square inch gauge (psig), preferably at a pressure not greater than about 60 psig. Steam and an oxygen-containing gas, such as, air or oxygen, are passed via line 5 through internal inlet conduit 6 into nozzles 7 located in the gasifier to serve also as the fluidizing gas needed to form a fluidized bed of the coke particles. The only introduction of fluidizing gas into the gasifier to fluidize the coke particles and maintain them in a state of fluidized bed is through nozzles 7. Each nozzle 7 is connected to a vertical inlet conduit 6. More than one nozzle 7 may be connected to the same vertical inlet conduit. Although vertical inlet conduit 6 is shown as having two symmetrical nozzles 7, one or more than two nozzles connected to a single inlet conduit would also be suitable. In FIG. 1, three inlet conduits, each having two nozzles, are shown. It is to be understood that one or more such inlet conduits having one or more nozzles could be used depending on the specific gasification process and size of the gasification vessel utilized. In commercial size gasifiers, more than one such nozzles would be utilized to fluidize the bed. Returning to FIG. 1, each nozzle 7 is directed in a downward direction at an angle of declination from horizontal axis 8 at least as great (that is, at least equal to) or greater than the angle of repose 9 of the coke particles present in gasifier 1. The angle of declination of nozzle 7 can range up to an angle of about 90°. By the expression "angle of repose" is intended herein the specific angle that a powdered, granular or particulate matter will assume when it is unloaded in an unconfined manner. For example, for fluid petroleum coke, a typical angle of repose is 30°. Preferably, the nozzle is downwardly directed at an angle 15° to 60° greater than the angle of repose of the particles present in the gasifier. The gaseous mixture of steam and an oxidizing gas introduced into the gasifier via line 5, then through internal vertical conduit 6, leaves the orifice of nozzle 7 at an exit velocity in the range of about 50 to 500 feet per second, preferably at a gas exit velocity from the nozzle in the range of about 100 to 350 feet per second. For example, an angle of declination 15° to 30° greater than the angle of repose of the particles may be utilized with a gas exit velocity greater than 175 feet per second. Desirably, the higher gas exit velocities are utilized as the angle of declination of the nozzle approaches the angle of repose of the particles.

Reaction of the coke particles with the steam and oxygen-containing gas produces a fuel gas which is removed overhead from the gasifier via line 10. An ash-rich coke residue containing metallic components, including vanadium compounds, is present in the gasifier. The surface and tip of the nozzle are substantially free of ash depositions.

By injecting the oxidizing gas in a downward direction into the bed, the nozzle surface is above the oxidizing zone which is near the inlet of the oxidizing gas. The presence of stagnant or slow moving coke particles near the gas inlet is controlled by injecting the oxidizing gas at a specified range of velocity into the bed.

Figure 2:
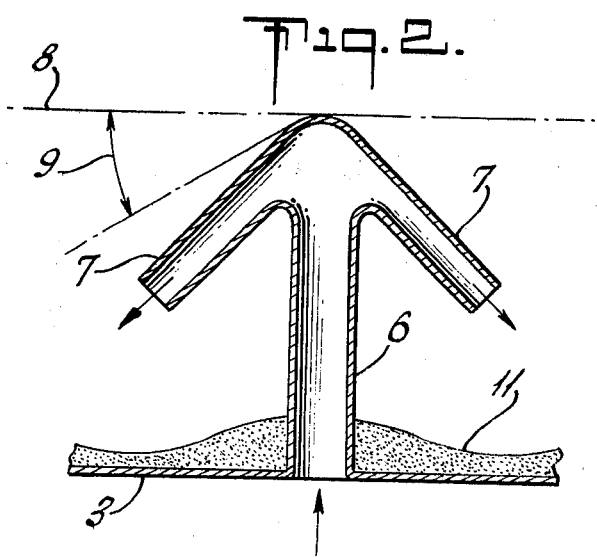
FIG. 2 is a detailed schematic representation of the gas inlet nozzle shown in the apparatus of FIG. 1.

In FIG. 2, nozzle 7 of FIG. 1 is shown in enlarged side elevation section.

Although the process of the invention is particularly well suited for gasification reactions, it is also applicable to other fluidized bed systems to inhibit the presence of slow moving particles near a gas inlet or to provide for more uniform mixing of the particles in a fluid bed.

The following example is presented to illustrate the process and nozzle of the present invention.

EXAMPLE

Tests were conducted with nozzles having three different types of configuration as follows:

A. An upwardly directed flow nozzle having a vertical straight tube stem or inlet conduit having an opening at its upper end. The internal diameter of the tube was one-fourths of an inch and the opening in the tip was 0.23 inches.

B. A side directed flow nozzle having a vertical straight tube stem or inlet conduit closed at its upper end. The internal diameter of the tube was one-fourths of an inch and the outer diameter was three-eighths inches with four holes of 2 millimeters spaced 90° apart. The gas exited from the holes at a 90° angle from the vertical axis of the inlet tube.

C. A downwardly directed flow nozzle having a vertical straight tube inlet stem and a nozzle directed at an angle of declination 90° from the horizontal axis. The internal diameter of the stem was one-eighths of an inch and the outer diameter of the stem was one-fourth of an inch.

The tests were carried out in a 3 inch by 96 inches reactor in which a high ash coke obtained from a commercial coker was gasified continuously by reaction with a gas mixture of steam and air. A single nozzle design was evaluated during each run. The operating conditions and results are summarized in the following table.

| Nozzle Design | Feed Coke from Commercial Fluid Coker | | |
|---|---|---|---|
| | A | B | C |
| Ash Content of Feed Coke, wt. % | 0.68 | 0.68 | 0.68 |
| Vanadium Content of Feed coke, ppm | 2800 | 2800 | 2800 |
| Temperature, °F. | 1800 | 1800 | 1800 |
| Pressure, psig | 0 | 0 | 0 |
| Gasification Level, % | 69 | 67 | 64 |
| Length of Test Run, Hrs. | 105 | 99 | 144 |
| Gas Exit Velocity, Ft/Sec. at 1000°F. | 97 | 95 | 149 |
| $\frac{\text{Wt. of Deposit}}{\text{Wt. of Ash Fed}} \times 100$ | 2.2 | 0.4 | 0.0 |

The above data show that no deposit was formed on the downwardly directed nozzle.

What is claimed is:

1. In a gasification process wherein an oxygen-containing fluidizing gas is introduced through a nozzle into a bed of carbonaceous particles containing metallic contaminants, the improvement which comprises: preventing the formation of metallic ash deposits on said nozzle by introducing said oxygen-containing fluidizing gas into said bed as a downwardly directed stream at an angle of declination from a horizontal axis at least as great as the angle of repose of said bed particles and at an inlet velocity into said bed in the range of about 50 to 500 feet per second.

2. The process of claim 1 wherein said inlet velocity of said oxygen-containing gas is in the range of about 100 to 350 feet per second.

3. The process of claim 1 wherein said downwardly directed nozzle is at an angle of declination of about 15° to 60° greater than the angle of repose of said carbonaceous bed of particles.

4. The process of claim 1 wherein said angle of declination ranges up to an angle of about 90°.

5. The process of claim 1 wherein said inlet velocity of said gas is greater than about 175 feet per second and said angle of declination is about 15° to 30° greater than said angle of repose.

6. The process of claim 1, wherein said oxygen-containing gas comprises a mixture of steam and an oxidizing gas.

7. In a gasification process wherein an oxidizing fluidizing gas is introduced into a bed of carbonaceous particles containing metallic impurities through a nozzle positioned in said bed, the improvement which comprises: preventing the formation of metallic ash deposits on said nozzle by introducing said fluidizing gas into said bed through a downwardly directed nozzle at an angle of declination from a horizontal axis at least as great as the angle of repose of said bed particles and at a gas exit velocity from said nozzle in the range of about 50 to 500 feet per second.

* * * * *